UNITED STATES PATENT OFFICE.

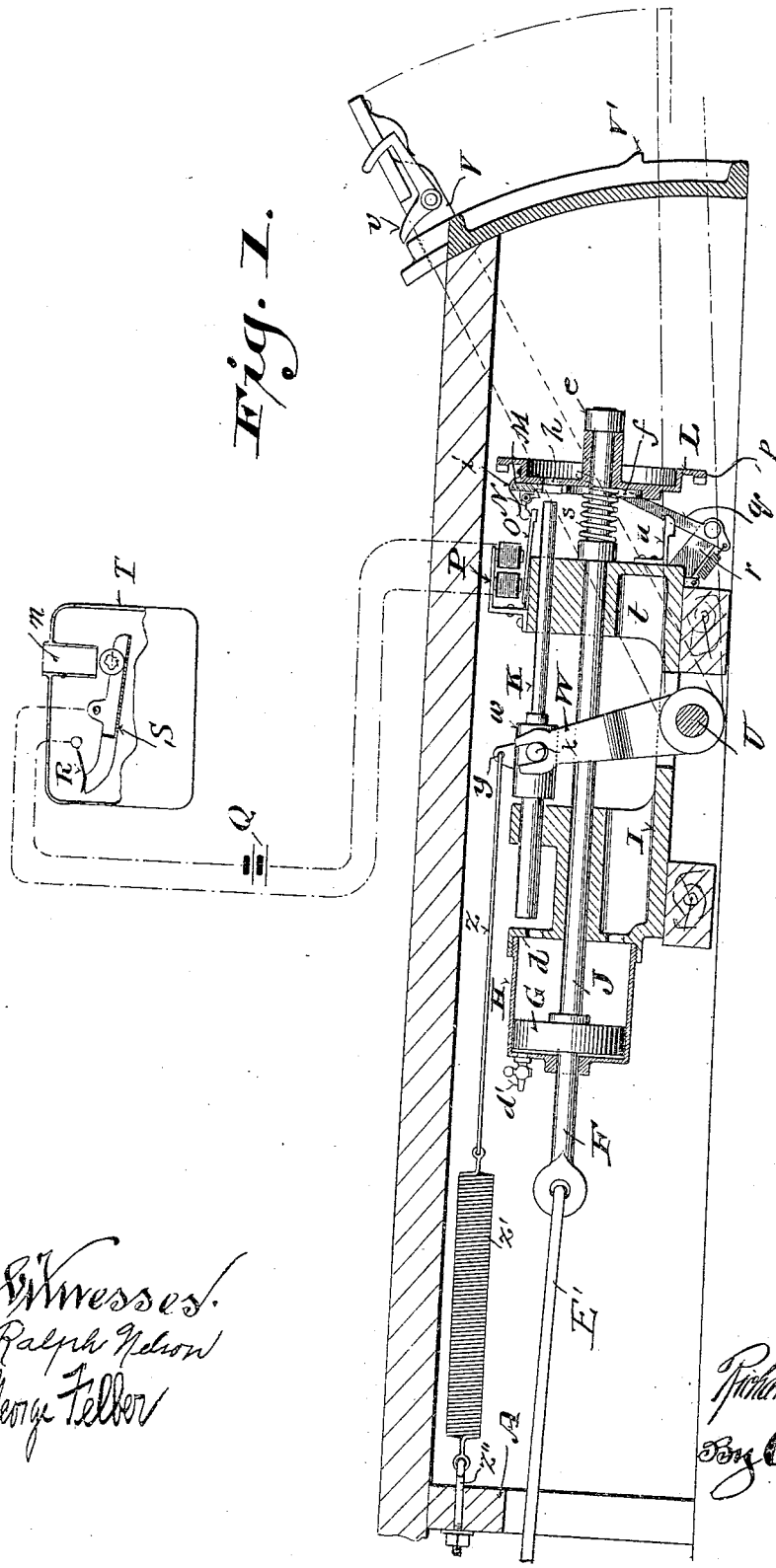

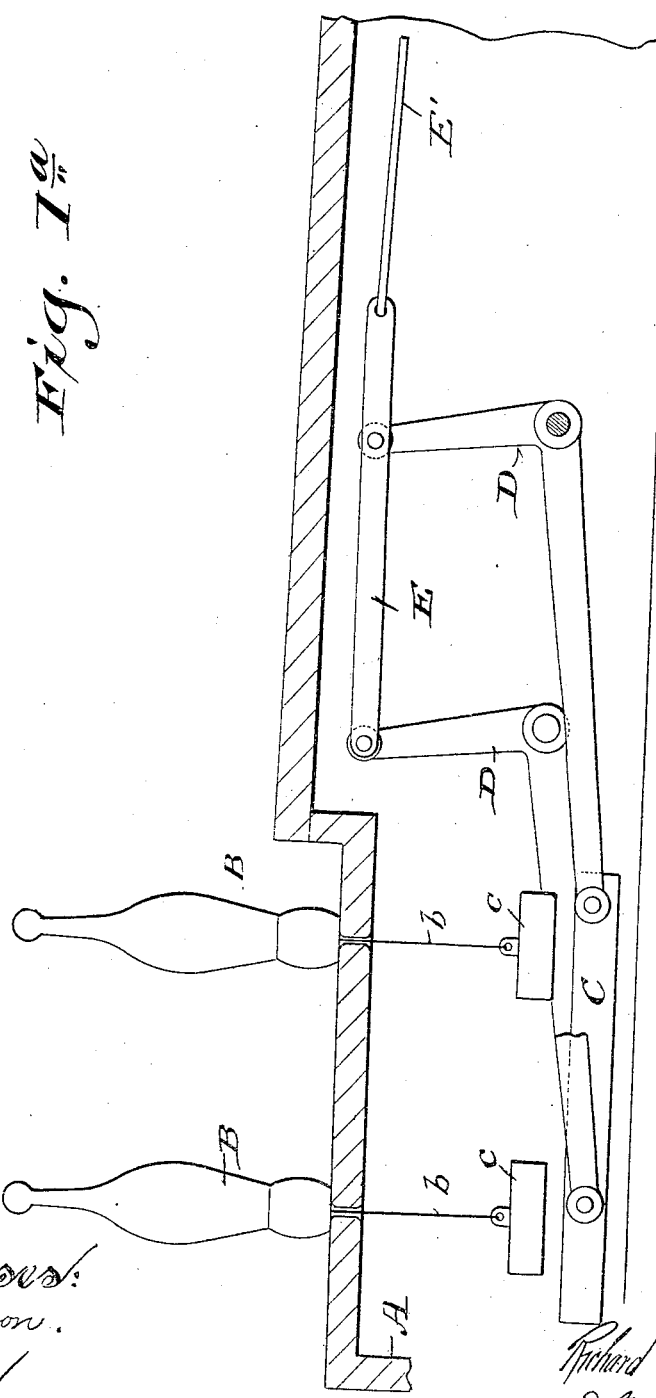

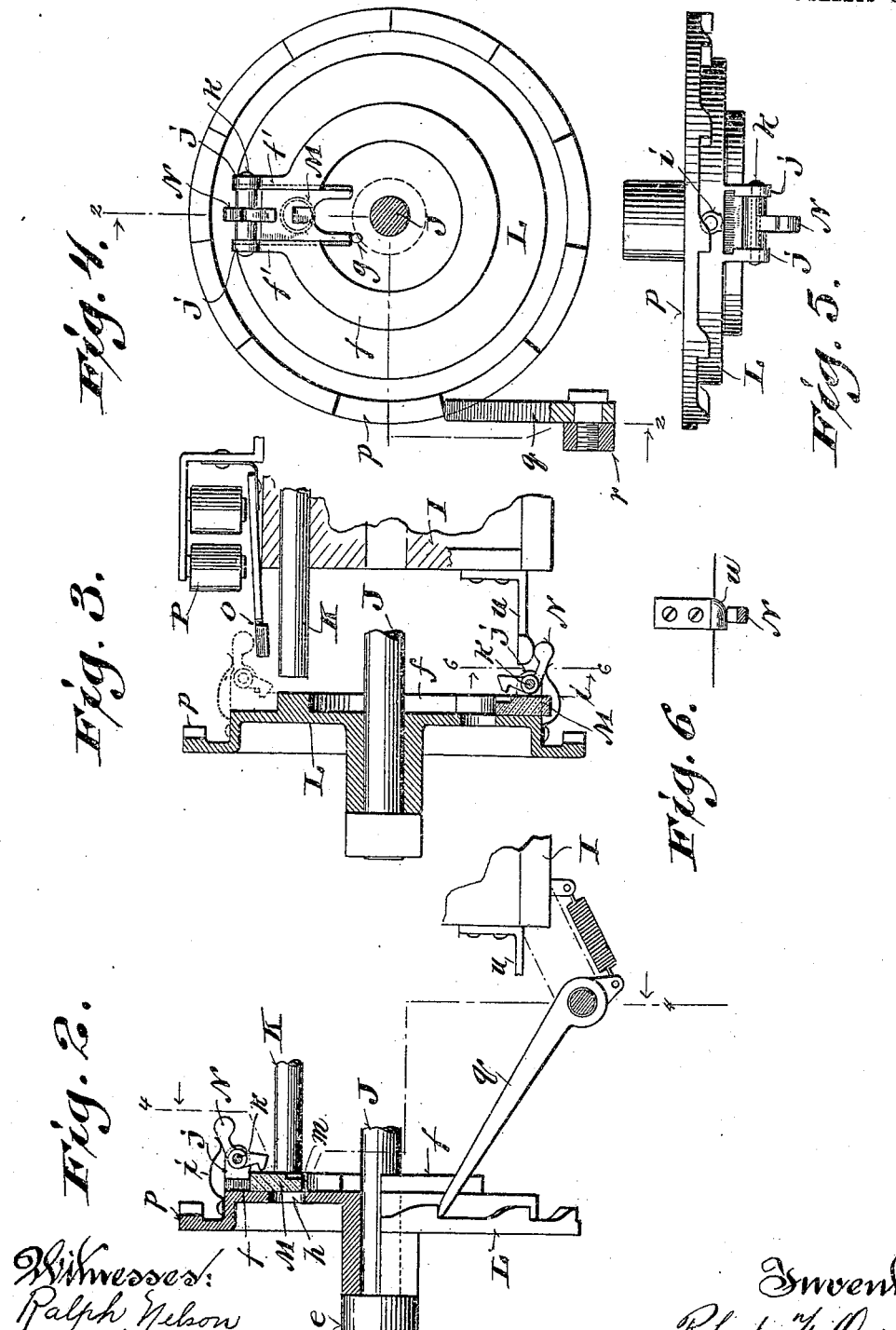

RICHARD F. DOWNEY, OF MILWAUKEE, WISCONSIN, ASSIGNOR TO AUTOMATIC BOWLING ALLEY COMPANY, OF MILWAUKEE, WISCONSIN.

BOWLING-GAME APPARATUS.

954,943.

Specification of Letters Patent.   Patented Apr. 12, 1910.

Application filed February 29, 1908. Serial No. 418,522.

*To all whom it may concern:*

Be it known that I, RICHARD F. DOWNEY, a citizen of the United States, and resident of Milwaukee, in the county of Milwaukee and State of Wisconsin, have invented certain new and useful Improvements in Bowling-Game Apparatus; and I do hereby declare that the following is a full, clear, and exact description thereof.

The improvements have especial reference to means for controlling actuating mechanism in pin set-works of automatic bowling-game apparatus such as is herein shown and described; the object of the invention being to provide simple automatic means for electric release of mechanism as aforesaid, particular reference being had to an electro-magnet, its armature as a trip-actuating device and a magnet-circuit make-and-break devices as hereinafter more particularly described.

Figure 1 of the drawings represents a vertical longitudinal central section view of a fragment of a bowling-game apparatus illustrating my invention in conjunction with a pin set-works of same; Fig. 1ª a similar view of a continuation of the apparatus; Fig. 2, a partly sectional side elevation of a detail of the set-works, indicated by lines 2—2 in Fig. 4; Fig. 3, a partly sectional side elevation of another detail of the set-works; Fig. 4, a view indicated by lines 4—4 in Fig. 2; Fig. 5, a plan view of a disk, shutter and latch otherwise shown in previously described views, and Fig. 6, a sectional view on the plane indicated by line 6—6 in Fig. 3.

Referring by letter to the drawings, A indicates a box-like casing the top of which is made to constitute a roll-way as well as a pin-stand and ball-pit at different elevations. Attached to the bottom of each pin B of the apparatus is a flexible hanger $b$ that extends through an aperture provided in the stand aforesaid, and attached to the lower end of each hanger is a weight $c$ by which said pin is automatically set. Underlying the weights is a platform C attached at each of its sides to long arms of bell-crank levers D suitably fulcrumed, and the connection of these levers with the platform is such that the latter is always on a horizontal plane regardless of its movement from time to time in a vertical direction. Short arms of the bell-crank levers are connected in pairs, by links, one of these links E being shown in Fig. 1ª, and said links are suitably coupled by a connecting device E' to a shank F of a piston G in a cylinder H that is herein shown as having screw-thread connection with an annular flange $d$ of a casting I suitably mounted in the aforesaid casing, this flange of the casting being a vented head of the cylinder, the opposite head of said cylinder being vented by a relief cock $d'$ or otherwise as may be convenient or desirable. The casting is provided with guides for the rod J of the piston G, as well as for another rod K parallel to said piston-rod, above the same, and which has the function of a pusher. The piston-rod is provided with an end-collar $e$ and serves as an arbor for a disk L, the hub of which disk opposes said collar. Angular extensions $f'$ of an otherwise circular projection $f$ of the disk serve as guides for a forked sliding shutter M radially of said disk in tongue-and-groove engagement with said guides, which shutter is a closure for an aperture $h$ in the aforesaid disk. A stop-lug $g$ of the disk limits play of the shutter in one direction, and a spring $i$ in connection with said disk limits play of said shutter in the opposite direction.

Ears $j$ of the guides $f'$ support a pivot-pin $k$ upon which a bell-crank trip-latch N is hung under control of the spring $i$, and a hook-arm of the latch is engageable with a notch $m$ in one side of the shutter M, the other arm of the latch being at times in opposition to a spring-recoil armature O of an electro-magnet P wired in circuit with a battery Q, one terminal of the circuit being a contact-plate R preferably opposed to a pivotal trough-like circuit-closer S within a check-box T that is provided with a check-chute $n$ leading to said circuit-closer, but any suitable form of circuit closer may be employed.

The disk L is provided with a ratchet-flange $p$ engageable with a spring-controlled pawl $q$ in pivotal connection with a lug $r$ of the casting I, and a spiral-spring $s$ is arranged under tension on the piston-rod J between a collar $t$ of same and said disk to provide sufficient friction to prevent overrunning of the aforesaid disk when the same has intermittent step-by-step rotary movement, as hereinafter more particularly described. A guide-stop and tripper $u$ in connection with the casting I straddles the pawl $q$ aforesaid.

Arranged in suitable bearings is a rock-shaft U, and a treadle lever V is attached to one end of the shaft outside the casing, said lever being provided with a spring-controlled latch $v$ for engagement with a keeper-lug $v'$ of the approach end of said casing. Fast on the aforesaid shaft is a crank W having a yoke-end astraddle of a collar $w$ of the pusher-rod K and in spanner-connection with lateral lugs $x$ of the same, an ear $y$ of said collar being connected to one end of a link $z$ that has its other end attached to a spiral-spring $z'$ secured to a tension-bolt $z''$ in the framing of the casing aforesaid.

The disk L being in normal position, the shutter M caught by the latch N is in position to clear the aperture $h$ in said disk. Hence if there be a depression of the lever V, the rod K will move through said aperture without disturbing the aforesaid disk, and should a ball or balls be bowled, none of the pins will fall because of the same being held at the time in set position by the weights $c$ then clear of the previously lowered platform C by which they are intermittently supported.

If a check be deposited in the chute $n$ of the check-box T, it will fall into the circuit-closer S and tilt the same out of normal position to that shown in Fig. 1, whereby the electro-magnet R will be energized to attract the armature O to cause a tilt of the latch N and release of the shutter M, which shutter has gravity descent to close the aperture $h$ in the disk L and be in the path of the rod K aforesaid. In the meantime the check has cleared the circuit-closer and the latter returns to normal position thus breaking the circuit. Now if the lever V be depressed, the rod K opposing the shutter will cause a movement of the disk L and parts in connection therewith toward the approach-end of the apparatus, whereby the platform C and weights $c$ are elevated to slacken the weight-hangers attached to the bowling-pins now upright on said platform. The lever V is latched for a time against draw of the spring $z'$ and the gravity of the aforesaid platform and weights. The player now bowls one frame of the game, after which the lever V is released, the result being an adjustment of the platform C to clear the weights $c$, and fallen pins are automatically reset. In the meantime the disk L has moved one step of its full revolution, because of the engagement of its ratchet-flange $p$ with the pawl $q$, this movement taking place when said disk is carried by the piston-rod J toward the casting I in which said rod and the one K have their play. The lever V is again swung down and its intermittent operations repeated until the player has bowled all ten frames of his game, the timing of the intermittent rotary motion of the disk L being such that provision is had for all the set-ups possible in said game, there being eleven teeth on the ratchet-flange of said disk. After the shutter M has cleared the path of the rod K the disk L itself becomes the stop for said rod and so continues until the aperture $h$ in said disk is again in register with the aforesaid rod. At about the time the disk has completed one-half of a full revolution, the latch N is retracted out of spring-pressed frictional contact with the shutter M, by means of the tripper $u$, as shown in Fig. 3, whereby said shutter is free to adjust itself to original position in which it is latched by said latch as soon as the same clears said tripper.

I claim:

1. The combination in a bowling-game apparatus of pin set-works embodying a reciprocative pusher and a reciprocative arbor, a disk rotative on the arbor and provided with an aperture normally in register with the pusher that is free to move through same when open; a slide-shutter for said aperture guided on the disk, a spring-controlled trip-latch by which the shutter is held clear of the aforesaid aperture, means for electric retraction of the latch to free the shutter, and means for imparting step-by-step rotary motion to said disk coincident with a reciprocation of its arbor and the aforesaid pusher.

2. The combination in a bowling-game apparatus of pin set-works embodying a suitably guided pusher, a rock-shaft having crank-connection with the pusher, a shaft-controlling treadle-lever, means for holding the lever depressed, and a reciprocative arbor; a disk rotative on the arbor and provided with an aperture normally in register with the pusher that is free to move through same when open, a slide-shutter for said aperture guided on the disk, a spring-controlled trip-latch by which the shutter is held clear of the aforesaid aperture, means for electric retraction of the latch to free the shutter, and means for imparting step-by-step rotary motion to said disk coincident with a reciprocation of its arbor and the aforesaid pusher.

3. The combination in a bowling-game apparatus of a casting having a cylinder extension, a piston in the cylinder provided with a rod and shank in opposite directions, the rod being guided in the casting and constituting an arbor, and a pusher also guided in said casting; a disk rotative on the arbor and provided with an aperture normally in register with the pusher that is free to move through same when open, means for actuating said pusher, a slide shutter for said aperture guided on the disk, a trip-latch by which the shutter is held clear of the aforesaid aperture, means for electric retraction of the latch, means for imparting step-bystep rotary motion to said disk coincident with a reciprocation of its arbor and the pusher subsequent to release of said shutter, and a movable pin-weight platform, and platform lever-mechanism in connection with the piston-shank.

In testimony that I claim the foregoing I have hereunto set my hand at Milwaukee in the county of Milwaukee and State of Wisconsin in the presence of two witnesses.

RICHARD F. DOWNEY.

Witnesses:
N. E. OLIPHANT,
GEORGE FELBER.